United States Patent [19]
Sulfaro et al.

[11] 3,715,308
[45] Feb. 6, 1973

[54] APPARATUS AND PROCESS FOR TREATING TOXIC WASTE MATERIALS

[75] Inventors: Andrew N. Sulfaro, Sterling Heights; Alfred H. Stein, Southfield, both of Mich.

[73] Assignee: Oxy Metal Finishing Corporation, Warren, Mich.

[22] Filed: June 4, 1971

[21] Appl. No.: 149,964

[52] U.S. Cl. ............... 210/60, 210/61, 210/62, 210/96, 210/103, 210/195
[51] Int. Cl. ............................................. C02c 5/02
[58] Field of Search ...... 210/60, 62, 61, 195, 199, 96, 210/103

[56] References Cited

FOREIGN PATENTS OR APPLICATIONS

| 895,741 | 5/1962 | Great Britain | 210/62 |
| 895,742 | 5/1962 | Great Britain | 210/62 |

OTHER PUBLICATIONS

Sweglar, C., Plating Solutions, Industrial Wastes, May 1959, pp. 40–42

*Primary Examiner*—Michael Rogers
*Attorney*—Stanley H. Lieberstein and William J. Schramm

[57] ABSTRACT

An apparatus and method for continuously treating and destroying toxic constituents in effluent waste streams from metal finishing processes such as aqueous rinse solutions containing dissolved hexavalent chromium and cyanide compounds present in concentrations which are lethal to marine ecology. The apparatus and process provide for a two-stage treatment of such waste streams which are continuously recirculated in each stage and their chemical characteristics are continuously monitored and adjusted so as to assure optimum conditions for promoting the desired chemical reactions for effecting a destruction of the toxic constituents and assuring that the effluent continuously discharged from the treating apparatus is devoid of any harmful constituents.

10 Claims, 4 Drawing Figures

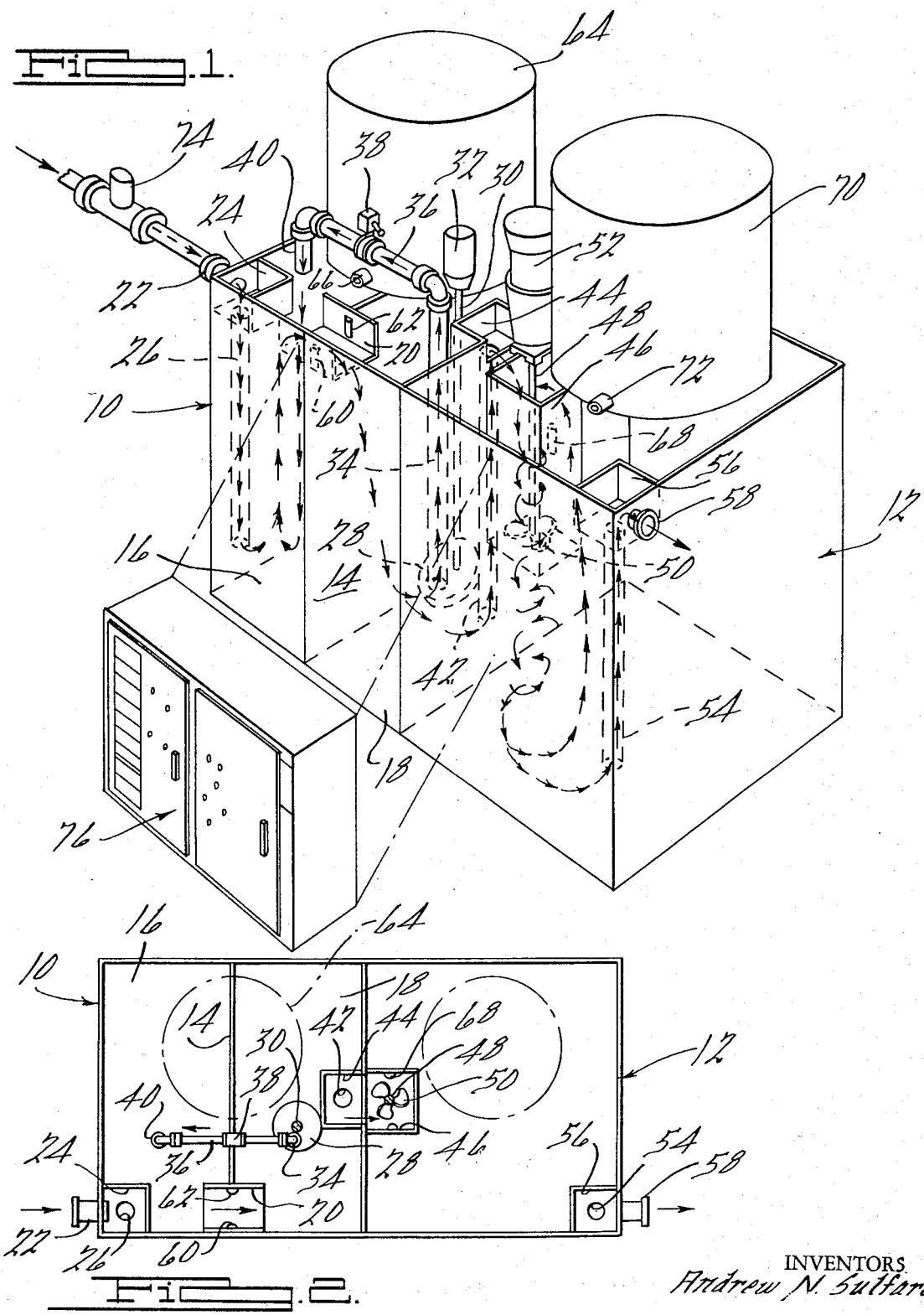

APPARATUS AND PROCESS FOR TREATING TOXIC WASTE MATERIALS

BACKGROUND OF THE INVENTION

The increasing public concern over the pollution of our lakes and streams, coupled with the adoption of Federal, state and local regulations governing the discharge of waste materials into sanitary sewer systems, has occasioned increased effort in developing new and improved processes and systems for handling toxic waste materials. One source of toxic waste streams are metal treating processes and particularly water rinse solutions containing minimal but harmful concentrations of dissolved toxic compounds, of which hexavalent chromium and cyanide compounds are perhaps the most notorious. The detrimental effects on marine ecology of these two constituents has long been recognized and various treatment processes have been used or proposed for use over the years to effect a neutralization and/or destruction of these materials to permit discharge of such waste streams into sanitary sewer systems without any harmful effects.

In waste treatment systems of the types heretofore known, it is conventional to convert the toxic hexavalent chromium salts to harmless trivalent chromium, while the cyanide salts are converted to soluble alkali metal cyanates and preferably are completely decomposed to nitrogen and carbon dioxide. The chemical reactions employed to effect the destruction of these toxic constituents are well known and can also be employed in accordance with the practice of the present invention. The chemical treatment and destructive reactions can be performed on a batchwise as well as in a continuous manner. While the continuous treatment of such toxic effluent streams provides distinct economic advantages in cases where large amounts of such dilute waste streams are generated, there has been a hesitancy on the part of many plants to adopt such continuous processing systems due to the possibility of toxic waste materials passing unaltered through the system as a result of error or inattention of operating personnel or channeling of toxic wastes through the system without proper treatment.

The apparatus and process comprising the present invention provides for a fail-safe system for continuously treating and destroying toxic hexavalent chromium and cyanide constituents in dilute waste streams on a fully automatic and integrated basis, providing not only economy in the disposal of such harmful waste streams, but also assuring that no accidental discharge of such toxic constituents can occur into sanitary sewer systems.

SUMMARY OF THE INVENTION

The benefits and advantages of the present invention are achieved by an apparatus comprising two stages as defined by a first receptacle which includes a first compartment and a second compartment, and a second receptacle downstream therefrom. The liquid waste stream is continuously introduced through an inlet into the first compartment at a preselected influx rate and is admixed with the larger body of solution therein. A portion of the admixed solution is continuously withdrawn from the first compartment at the preselected influx rate at a location remote from the inlet of the waste solution and is discharged in admixture with a solution present in the second compartment. The consolidated solution flowing from the first to the second compartment is continuously monitored to evaluate the chemical characteristics thereof and appropriate reagents are added to maintain optimum conditions for promoting the destructive chemical reaction. A portion of the solution is continuously withdrawn from the second compartment at a point remote from the location of discharge of solution from the first compartment and is again returned to the first compartment for admixture with the solution therein along with make-up reagent materials added thereto. A portion of the solution is continuously withdrawn from the second compartment at the preselected influx rate and is discharged into admixture with a solution in the second receptacle in admixture with the solution therein and is continuously recirculated to assure homogeneity thereof. The chemical characteristics of the solution entering the second receptacle are continuously monitored and appropriate reagents are added in response thereto to maintain proper chemical balance of the consolidated solution in the second receptacle. A portion of the solution is continuously withdrawn from the second receptacle at a point remote from the location of entry of solution from the first phase and is continuously discharged as a harmless aqueous effluent into the sanitary sewer system. The recirculation and reconsolidation of the stream upon moving through the first and second stages of treatment assures proper residence time of the chemical constituents to enable completion of the destructive reactions and also assures that no channeling of untreated toxic waste materials can occur. The continuous monitoring of the solutions at several points is also response to prevent further input and discharge of solution from the system in the event an imbalance in one or more chemical characteristics of the solutions occur at any point of their processing.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a perspective view, partly schematic, of the treating apparatus and direction of liquid flow therethrough;

FIGS. 3A and 3B are wiring diagrams of the control circuit for achieving automatic and continuous operation of the apparatus of FIG. 1.

DESCRIPTION OF THE PREFERRED EMBODIMENTS

Figure 2A:
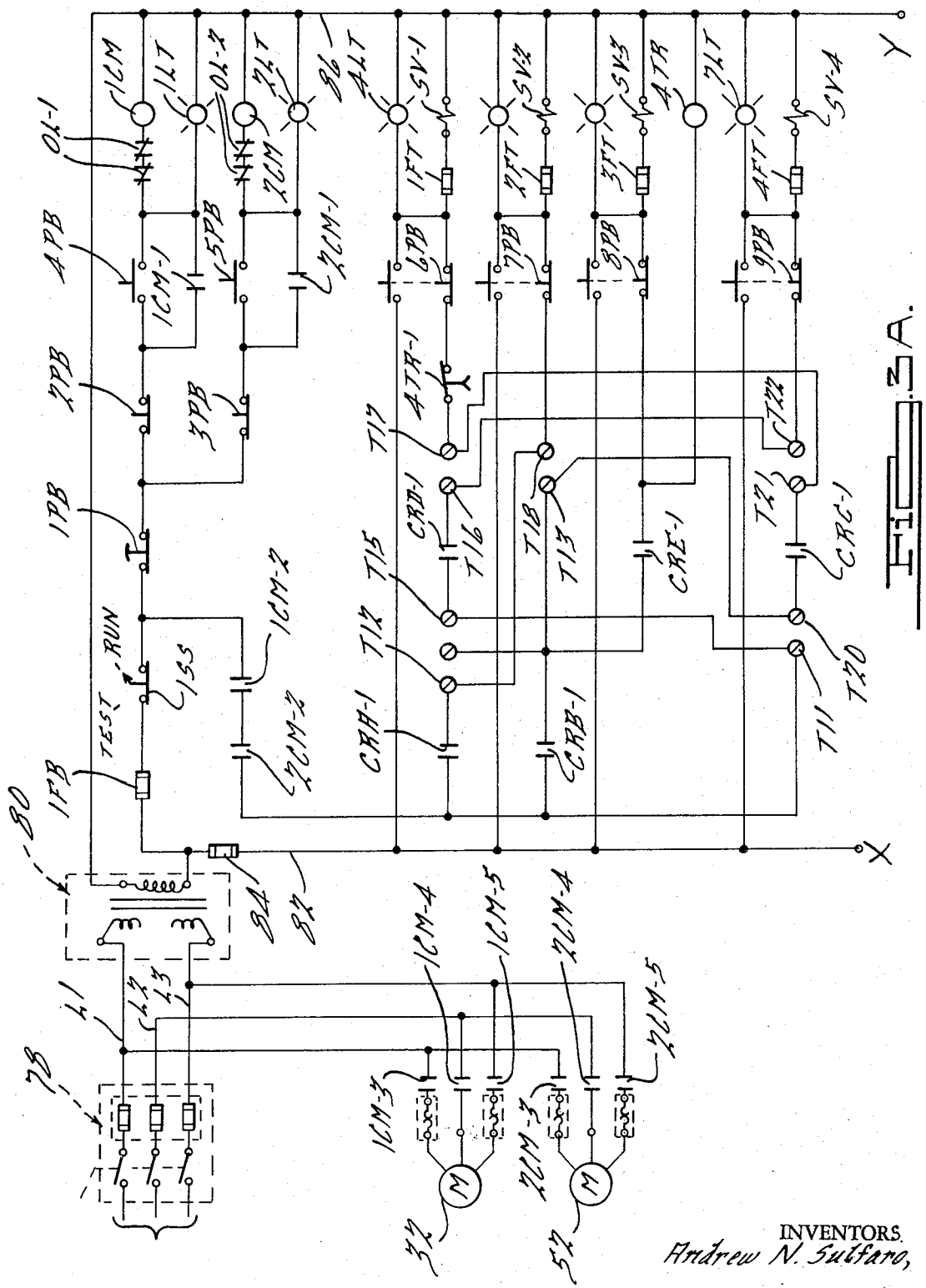
FIG. 2 is a plan view of the apparatus shown in FIG. 1 with portions thereof broken away for clarity.

Referring now in detail to the drawings and as may be best seen in FIGS. 1 and 2, the apparatus comprising the present invention consists of a framework defining a first tank 10 and a second tank 12, through which the aqueous waste solution sequentially flows while reagents are added thereto to effect the desired chemical reaction with the toxic constituents therein. The first tank 10 is provided with an upright transverse partition 14 disposed approximately midway therealong defining a first compartment 16 and a second compartment 18 which are interconnected by means of a trough or weir 20 mounted along one side of the upper edge of the partition 14.

The waste solution, such as a water rinse solution containing dilute concentrations of dissolved hexavalent chromium or cyanide compounds derived from cyanide copper, cadmium and zinc rinses or other cyanide bearing rinses, enters the first compartment of the first tank 10 through a flanged inlet 22 which is disposed in communication with an inlet compartment 24 provided with an upright downcomer or standpipe 26 mounted in the base thereof. Accordingly, the waste solution enters the inlet and thereafter passes downwardly in the direction of the arrows through the downcomer and is discharged from the lower end thereof into admixture with the solution in the first compartment. The consolidated and admixed solution thereafter passes upwardly in the direction of the arrows and a portion thereof continuously overflows through the action of gravity through the trough 20 into the second compartment 18 of the tank 10.

A portion of the solution in the second compartment 18 is continuously withdrawn adjacent to the bottom thereof and remote from the discharge side of the trough 20 by means of a submersible pump 28 driven by a shaft 30 connected to a motor 32 mounted above the tank 10. The discharge side of the pump 28 is connected to a riser conduit 34, to the upper end of which a horizontal branch 36 is connected and is provided with a remotely actuatable injector 38 for continuously or intermittently introducing chemical reagent to the solution passing therethrough. The solution is discharged through the end of a downwardly directed discharge line 40 which is connected to the output end of the horizontal branch 36. The recycled solution with make-up reagent therein is uniformly admixed with the solution in the first compartment and after sweeping downwardly and across the base of the tank, again flows upwardly and a portion thereof is transferred to the second compartment through the overflow trough 20.

A portion of the solution from the second compartment is continuously withdrawn through a normal overflow action at a rate corresponding to the preselected influx rate of waste solution into the system by means of a riser pipe 42 which extends with its inlet end spaced from the bottom of the second compartment upwardly and in communication with a liquid-tight chamber 44 mounted on the upper end portion of a partition separating tanks 10 and 12. The liquid entering the chamber 44 overflows and is discharged into the upper end of an open-ended rectangular duct 46 through which a shaft 48 of a propeller-type mixer extends having a propeller 50 secured to the lower end thereof and which is driven by a motor 52 drivingly coupled to the upper end thereof. The direction of rotation and orientation of the propeller 50 is such that the solution in the tank 12 and disposed within the duct 46 is caused to move downwardly, whereby a continuous mixing of the solution overflowing into the tank 12 and the solution therein is accomplished and the consolidated solution is recirculated in accordance with the direction of flow depicted by the arrows in FIG. 1.

A portion of the solution in treating receptacle 12 is continuously withdrawn therefrom at the preselected waste solution influx rate through a riser pipe 54 having its inlet end disposed adjacent to the bottom of tank 12 and remote from the point of entry of the treated solution from tank 10. The withdrawn solution passes upwardly through the riser 54 into a discharge chamber 56 through a normal overflow action from which it is discharged through a flanged outlet 58. The fully treated solution flowing through the flanged outlet can be readily discharged into a sanitary sewer or can be subjected to further settling if desired or required to remove the harmless but entrained solids therein.

The chemical characteristics of the solution during its progressive transfer from the flanged inlet 22 out through the flanged outlet 58 is continuously monitored at strategic locations to assure the addition of appropriate reagents including acids, bases and reactive constituents to effect a chemical destruction of the toxic constituents therein. In the specific arrangement shown, a first stage pH electrode 60 and an oxidation-reduction potential (ORP) cell 62 are mounted in contact with the solution flowing through the trough 20 from the first compartment to the second compartment. In the treatment of hexavalent chromium contaminated waste solutions, the ORP meter is operative to control the injection of sulfur dioxide or equivalent reagents, such as sodium metabisulfite, through the injector 38 for admixture with the solution being recirculated through the horizontal branch 36. The pH electrode 60 in turn is operative to control the addition of a mineral acid such as sulfuric acid from a reagent tank 64 mounted above the first tank 10 and provided with a remotely operable valved outlet 66 for intermittently or continuously discharged a controlled amount of acid into the first tank so as to maintain the pH at a level preferably at about 3.5 or below at which the acid sulfonation reaction progresses rapidly in accordance with the following general equation:

$$SO_2 + H_2O \rightarrow H_2SO_3 \quad (1)$$

$$3H_2SO_3 + 2H_2CrO_4 \rightarrow Cr_2(SO_4)_3 + 5H_2O \quad (2)$$

The foregoing two step reaction generally occurs in about ten minutes under appropriate pH conditions and the aqueous solution containing all of the hexavalent chromium in the form of trivalent chromic sulfate thereafter overflows into the rectangular duct of the second tank, wherein a second stage pH electrode 68 mounted therein is operative to raise the pH to a level preferably within about 7 to about 8 by the addition of an alkali hydroxide, such as caustic, from a reagent tank 70 having a remotely operable operable valved outlet 72 in the base thereof which is disposed above the tank 12. The rapid conversion of the trivalent chromic sulfate to chromic hydroxide proceeds in accordance with the following general equation:

$$Cr_2(SO_4)_3 + 6NaOH \rightarrow 2CrOH)_3 + 3NaSO_4 \quad (3)$$

The solution discharged from the flanged outlet 58 in accordance with the foregoing treatment and flow cycle is at approximately a neutral pH and contains only non-toxic trivalent chromium hydroxide which can be removed by settling if desired or required.

In accordance with the foregoing arrangement, it will be apparent that the elevation of the inlet compartment 24, the trough 20, the overflow chamber 44 and the discharge chamber 56 and attendant piping is at a level such that a natural flow of solution occurs through the two stages as a result and in direct proportion to the amount of contaminated waste liquid introduced through the inlet portion of the system. The control of this influx of liquid waste can be achieved such as by means of a flow control device 74, as shown in FIG. 1, which may comprise a metering pump or, more usually, a remotely actuatable valve which on actuation prevents entrance of further waste solution in the event any chemical imbalance should occur in the first or second stage treatment, preventing discharge of solution from the apparatus until the imbalance is again corrected. The foregoing interlocking relationship between the several controls will be better understood during a subsequent description of the control system as diagrammatically shown in FIGS. 3A, 3B.

The arrangement as hereinbefore described is also effective to protect against surges of waste solution containing abnormally high concentrations of toxic constituents due to the rapid dilution of such surges in the first tank coupled with a recirculation of the solutions therein and a continuous monitoring of their composition to assure appropriate treatment.

Typically, the volume of the aqueous solution contained within the first tank relative to the influx rate of waste solution is in the order of at least about 3:1 and preferably from around 10:1 to about 20:1 for dilute solutions of the type normally derived from water rinse treatments which contain up to 500 ppm, more usually about 100 ppm, toxic constituents. Accordingly, the first tank may have a volume of about 600 gallons with an influx rate of about 30 gallons per minute of waste solution, thereby providing an average residence time within the first treatment stage of about 20 minutes. Similarly, the second tank is provided with a volume of about 600 gallons under these same circumstances such that a similar average residence time of 20 minutes is provided for during the second stage reaction. In addition to the foregoing, it is generally preferred that the rate of recirculation of solution from the second compartment to the first compartment be at least about two times the rate of influx of waste solution and preferably at least about 3:1 to about 4:1. Accordingly, at influx rates of about 30 gallons per minute, the rate of solution recirculated through the horizontal branch 36 would preferably be in the order of about 90 to 120 gallons per minute.

A detailed description of the control system shown in FIGS. 3A–3B will now be made using a sodium cyanide containing waste solution as illustrative of a continuous treatment and destruction of toxic contaminants. The control system may conveniently be housed in a control panel 76, as shown in FIG. 1, which is adapted to be mounted on the exterior walls of the tanks 10 and 12. Under such operating conditions, the first stage including compartments 16 and 18 are employed for the alkaline chlorination of the cyanide to form the cyanate at an alkaline pH of preferably above 10.5 in accordance with the following chemical equations:

$$NaCN + Cl_2 \rightarrow CNCl + NaCl \quad (1)$$

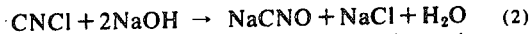

$$CNCl + 2NaOH \rightarrow NaCNO + NaCl + H_2O \quad (2)$$

Reaction (1) occurs at any pH and is almost instantaneous. However, the formation of cyanogen chloride (CNCl) which comprises tear gas also represents a hazard and its conversion to sodium cyanate in accordance with reaction (2) via a hydrolysis of cyanogen chloride is substantially impaired at a pH of less than about 10. In accordance with the preferred practice, pH's of at least 10.5 are employed by the addition of caustic from reagent tank 64 and the hydrolysis reaction under such favorable alkaline conditions is virtually completed in a matter of several minutes. In the case of substantially pure cyanide waste materials, reactions (1) and (2) take place in about 3 minutes under favorable conditions, but due to the inhibiting effect of other contaminants present in such waste streams, residence times preferably in the order of about 20 minutes in the first stage are preferred to assure complete reaction.

In addition, while sodium cyanate derived from the first stage is only one-thousandth as toxic as the original cyanide material, it is usually preferred to effect a further destruction of the cyanate constituent via oxidation in accordance with the following reaction to form nitrogen and carbon dioxide:

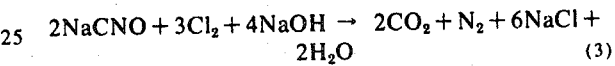

$$2NaCNO + 3Cl_2 + 4NaOH \rightarrow 2CO_2 + N_2 + 6NaCl + 2H_2O \quad (3)$$

This oxidation reaction is also dependent on the pH and the rate of oxidation increases as the pH decreases. Generally, pH's of from about 7.5 to about 8.0 require about 10 to 15 minutes to complete the oxidation reaction to convert the cyanate to harmless nitrogen and carbon dioxide. In contrast, about 30 minutes or more are required to effect this same reaction at pH levels ranging from 9.0 to about 9.5. In accordance with the exemplary process, the reagent tank 70 is filled with a suitable mineral acid, such as sulfuric acid, which itself does not enter into the reaction but serves merely to reduce the pH of the solution in the second stage to within the preferred range. The hydrolysis reaction itself progresses as a result of the presence of excess chlorine which is introduced during the first stage responsive to the ORP electrode.

The operation of the system is preferably initiated by filling both compartments of the first receptacle 10 and the second receptacle 12 to the appropriate level with water and adjusting the pH to provide aqueous solutions approaching that required to perform a specific treating function. With particular reference to FIGS. 1 and 3A and 3B, the latter being electrically connected at junctions X—X and Y—Y, respectively, the control circuit is energized by closing main disconnect switch 7 which, through lines L1, L2 and L3, effects energization of step-down transformer 80 which supplies a prescribed voltage of single phase current to the main control panel. The secondary coil of transformer 80 is connected to supply line 82 through fuse 84, while the opposite end of the secondary winding is connected to supply line 86.

Energization of the recirculation pump motor 32 is achieved by depressing normally open start push button switch 4PB which, through fuse block 1FB, selector switch 1SS disposed in a run position, master stop switch 1PB in the normally closed position, second push button stop switch 2PB and normally closed overload contacts OL-1, effects an energization of the coil of control relay 1CM which closes its contact 1CM-1 energizing pump on light 1LT and also closes its contact 1CM-2 and its motor run contacts 1CM-3 through 1CM-5, whereby motor 32 is energized. Similarly, the mixer motor 52 is energized by depressing normally open start push button switch 5PB which, through fuse block 1FB, selector switch 1SS, normally closed master stop switch 1PB, normally closed push button stop switch 3PB and normally closed overload contacts OL-2, energizes the coil of control relay 2CM, which closes its contact 2CM-1, effecting an energization of the agitation motor light 2LT and closes its contact 2CM-2 in series with contact 1CM-2 and also closes its motor start contacts 2CM-3 through 2CM-5, whereupon motor 52 is energized.

Figure 3B:
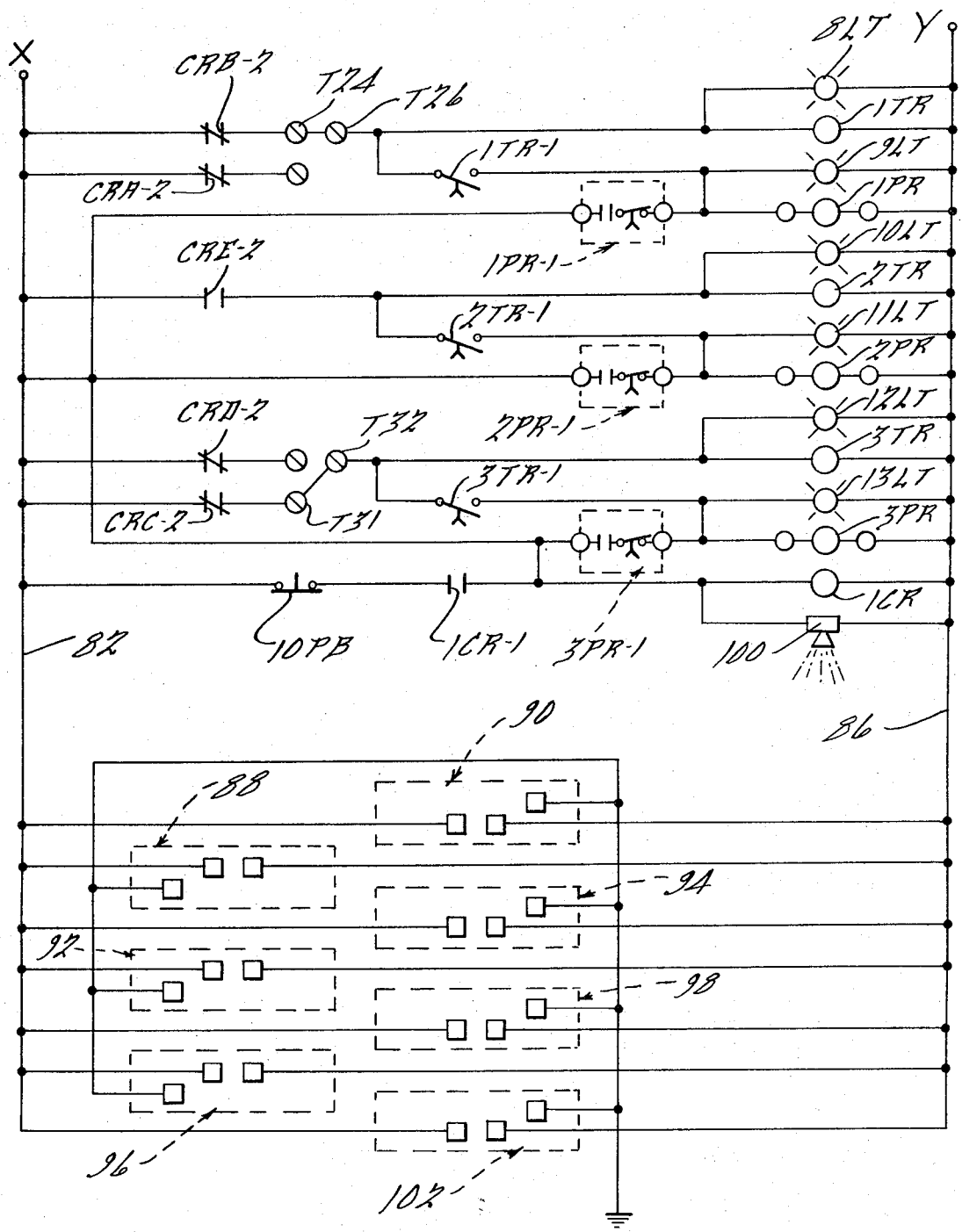

The control panel wired as shown in FIGS. 3A and 3B is for the treatment and disposal of cyanide type wastes such as derived from a water rinse tank which conventionally are of an alkaline pH usually in the order of about 10. As previously described, this waste material is adjusted for an optimum pH condition of at least about 10.5 and preferably within a pH range of about 11 to about 12 in the first stage. The pH is sensed by the first stage pH electrode 60, which is electrically connected to the first pH amplifier 88 that amplifies the electrical signal and transmits the amplified signal to the first pH meter 90, provided with a visual read out and pre-set low and high limits, which control the addition of caustic or other alkaline substances to the first receptacle through outlet 66 of reagent tank 64.

Assuming that the pH of the combined solution passing through the transfer weir 20 (FIG. 1) is within the pre-set pH limits of 11 and 12 as sensed by the first pH probe, the first pH meter 90 effects an energization of a self-contained coil CRA (not shown) which in turn closes its normally open contact CRA-1 which, through closed series contacts 1CM-2 and 2CM-2 through terminals T12 and T18, push button switch 7PB which is in a normally closed position and fuse 2FT, energizes the coil of solenoid valve SV2 incorporated in the outlet 66 of reagent tank 64 which opens and which continues the addition of caustic to the first stage solution. A second self-contained coil CRB (not shown) in the first pH meter is also energized which closes its normally open contact CRB-1 which, through series contacts 1CM-2, 2CM-2, terminal T13, terminal T20, normally open contact CRC-1, terminal T21, terminal T17, normally closed timer switch 4TR-1, normally closed contact 6PB of the input allowed control and fuse 1FT, effects an energization of the coil of solenoid SV-1 which is incorporated in the flow control unit 74 at the inlet end of the treating system and permits further influx of waste solution. Simultaneously, green indicator light 4LT is illuminated. It will be noted that for the input allowed solenoid valve SV-1 to be energized, the pH in both the first and second receptacles, as well as the oxidation reduction potential in the first receptacle, must be within limits and the contacts controlled thereby closed to permit continued influx of waste material and corresponding outflow of solution to the sanitary sewage system.

The ORP electrode 62 in the weir 20 between compartments 1 and 2 of tank 10 senses the oxidation reduction potential of the solution as established by the free chlorine content present. The electrode is connected to the ORP amplifier 92 which effects an amplification of the electrical signal received and a transmittal thereof to the ORP meter 94 in the control circuit which incorporates relay CRE (not shown) which is energized or de-energized depending on the setting of the meter to assure that appropriate chlorine is available for reaction with the cyanide for forming the sodium cyanate. In the condition where the ORP meter indicates a deficiency in the available chlorine necessary to completely react with the cyanide constituent present, the coil CRE in the meter is energized which effects a closure of its normally closed contacts CRE-1 and CRE-2. The closure of contact CRE-1 effects an energization of the coil of the solenoid valve SV-3 introducing further chlorine into the recirculation conduit through series contacts 1CM-2, 2CM-2, closed contacts CRB-1, CRE-1, normally closed push button contact 8PB and fuse 3FT. In addition, timer coil 4TR is simultaneously energized which commences to time a prescribed chlorine addition time period.

Additionally, contact CRE-2 is simultaneously closed which energizes alarm timer 2TR which commences to time a prescribed period, usually substantially in excess of that of addition timer 4TR. Simultaneously, amber timing light 10LT is illuminated. The chlorine addition timer may be conveniently set for 3 minutes whereupon chlorine or equivalent is added to the first stage solution during the timed period. The alarm timer 2TR may be conveniently set for 15 minutes to permit ample time for the correction of the deficiency in chlorine, which, if it doesn't occur within the timed alarm period, effects energization of an alarm horn or the like. Chlorine, accordingly, is continuously added to the aqueous solution being circulated in tank 10 which is continuously sensed by the ORP electrode and upon its sensing of a condition where the chlorine content is again present in sufficient quantity, this is signalled to the ORP amplifier, which in turn signals the ORP meter, effecting a de-energization of the coil of relay CRE which opens its contact CRE-1 closing the solenoid valve SV-3 through a de-energization of its coil and simultaneously de-energizing and effecting a resetting of reagent timer 4TR. Simultaneously therewith, alarm timer 2TR is de-energized in response to an opening of contact CRE-2, effecting a resetting thereof.

With the treating solution in appropriate chemical balance, in tank 10, it continuously overflows into tank 12 and is immediately admixed and agitated with the solution therein and its pH is sensed by pH electrode 68, which in turn is electrically connected to the second pH amplifier 96, which effects an amplification of the electrical signal, which is transmitted to the second pH meter 98 containing control relay coils CRC and CRD (not shown), providing a visual read out of the pH condition prevailing at that time. Under preferred operating conditions, the second pH meter is set at a high setting of 8.5 and a low setting of about 7.5 and is maintained in that range, such as by the addition of an appropriate mineral acid through outlet 72 of acid reagent tank 70 mounted thereabove. Assuming the pH of the solution entering the second receptacle is within the prescribed range, the coils of control relays CRC and CRD are energized, which in turn effect a closing of normally open contact CRC-1, as previously described, to effect a maintenance of the energized condition of solenoid valve SV-1, as well as CRD-1 which, through series contacts 1CM-2, 2CM-2, terminal T11, T15, CRD-1, terminal T16, terminal T22, normally closed push button switch 9PB and fuse 4FT, effects an energization of the coil of solenoid valve SV-4 incorporated in the outlet 72 which maintains continuous addition of mineral acid at a prescribed rate to the solution in the second receptacle. Simultaneously, blue indicator light 7LT is illuminated visually indicating this condition.

In accordance with the foregoing control circuitry, in the event appropriate conditions are not maintained within the treating receptacles, the input of waste treatment solution and correspondingly the discharge thereof from the process is halted until the condition is corrected to avoid discharge of toxic materials. In accordance with this procedure, if the pH as sensed by the pH electrode 60 in the first receptacle signifies a low pH condition at which inadequate reaction would occur between the chlorine and cyanide constituents, and also a condition in which other toxic materials, such as cyanogen chloride, are formed, and are stable, the coil of control relay CRB in the first pH meter 90 is de-energized, which opens contact CRB-1, effecting a de-energization of solenoid valve SV-3, preventing further addition of chlorine and also effects a de-energization of coil SV-1, closing flow control 74, preventing further addition of waste material to the system. Simultaneously, normally closed contact CRB-2 closes which, through terminals T24 and T26, effects an energization of timer motor 1TR which comprises an alarm timer for the first stage pH controller which proceeds to time out a prescribed time period and simultaneously amber warning light 8LT is illuminated to indicate such condition. When timer 1TR times out, normally open time closed contact 1TR-1 closes effecting an energization of red warning light 9LT and pulse relay coil 1PR, which in turn gives a momentary closure of pulse relay contact 1PR-1, which energizes an alarm horn 100 audibly signalling this condition and also energizes the coil of alarm relay 1CR, which closes its normally open contact 1CR-1 through normally closed push button contact 10BT, maintaining the alarm horn energized. In the event that the low pH condition corrects itself prior to the timing out of first phase pH timer 1TR, normally closed contacts CRB-2 is opened in response to the energization of the coil of relay CRB of the first pH meter, effecting a resetting of the timer to the zero position.

In a similar manner, in the event the ORP meter registers a deficiency of chlorine or an excess of cyanide present, as sensed by the ORP electrode 62 in the first stage, coil of control relay CRE is energized which closes contact CRE-1 and CRE-2 which, through contacts 1CM-2, 2CM-2, CRB-1 and CRE-1, energizes addition timer 4TR which effects an addition of chlorine on a timed basis to correct the foregoing condition. In the event this condition is not corrected within the pre-set addition period as timed by chlorine addition timer 4TR, it opens its normally closed timed open contact 4TR-1 which is in series with the coil of input allowed solenoid valve SV-1, effecting a de-energization and closing thereof, whereby no further waste solution enters the system. In the event this condition has not corrected itself at the time alarm timer 2TR times out, then normally open time close contact 2TR-1 closes which effects an illumination of alarm light 11LT and an energization of the coil of pulse relay 2PR which momentarily closes its pulse contact 2PR-1, which in turn energizes the coil of control relay 1CR, which closes its holding contact 1CR-1 and also maintains the alarm horn energized until de-energized by depression of push button switch 10PB.

In a similar manner, if the pH in the second stage goes above the pre-set limit of about 8.5 as sensed by the pH cell, the relay coils C and D in the second stage pH meter are de-energized which, through their normally closed contacts CRC-2 and CRD-2, effect a similar energization of timer 3TR through contact CRC-2 and terminals T31 and T32 which commences to time a prescribed period for the situation to correct itself and this condition is visually signalled by the illumination of amber panel light 12LT. At the same time, normally open contacts CRC-1 is opened which is in series with the input allowed solenoid valve SV-1 which becomes de-energized and closes preventing further input of waste solution to the unit. In the event the pH condition is not corrected in the second phase within the time pre-set on alarm timer 3TR, timer 3TR times out and closes its normally open time closed contact 3TR-1 which illuminates red warning light 13LT and simultaneously energizes the coil of pulse relay 3PR, which gives a momentary pulse closure of its contact 3PR-1, which in turn effects an energization of holding relay coil 1CR, closing its contact 1CR-1 and energizing the alarm horn 100. The pH and ORP conditions prevailing in the system are continuously recorded on recorder 102.

In a similar manner, the addition of sulfur dioxide gas in lieu of chlorine and the maintenance of appropriate pH in the first and second stages can be achieved by a re-wiring of the circuitry and a resetting of the acceptable limits of pH and ORP in the several stages to provide fail-safe operation.

While it will be apparent that the invention herein disclosed is well calculated to achieve the benefits and advantages hereinbefore set forth, it will be appreciated that the invention is susceptible to modification, variation and change without departing from the spirit thereof.

What is claimed is:

1. An apparatus for continuously treating waste solutions containing toxic constituents therein comprising a first receptacle including a first compartment and a second compartment, a second receptacle, inlet means for continuously discharging a waste solution into said first compartment at a preselected influx rate and in admixture with a solution therein, transfer means for continuously withdrawing a portion of the admixed said solution at said preselected influx rate from said first compartment at a location remote from said inlet means and for discharging said solution into said second compartment at an outlet point and in admixture with a solution therein, first sensing means for continuously monitoring the chemical characteristics of the admixed said solution withdrawn from said first compartment, first recirculating means for continuously withdrawing a portion of the admixed said solution from said second compartment at a location remote from said outlet point for return to said first compartment for admixture with said solution therein, flow means for continuously withdrawing a portion of the admixed said solution at said preselected rate from said second compartment at a location remote from said outlet point for discharge into said second receptacle at a discharge point and in admixture with a solution therein, second sensing means for continuously monitoring the chemical characteristics of said solution being discharged into said second receptacle, second recirculating means for continuously recirculating a portion of the admixed said solution in said second receptacle through a path by which a portion is returned to said discharge point, outlet means for continuously withdrawing a portion of said solution at said preselected rate from said second receptacle at a location remote from said discharge point, and injection means for adding a chemical reagent to said solution in response to said sensing means for converting the toxic ingredients therein to substantially harmless materials.

2. The apparatus as defined in claim 1, wherein said toxic constituent comprises hexavalent chromium ions and said first sensing means is operative to control said injection means for introducing sulfur dioxide in a quantity sufficient to convert substantially all of the hexavalent chromium present to trichromium sulfate, said first sensing means further including means for introducing mineral acid into said solution in said first receptacle in a quantity to maintain the pH thereof at about 3.5 or less, said second sensing means operable for introducing an alkali hydroxide into said solution in said second receptacle for raising the pH to a level of between about 7 to about 8 for effecting a hydrolysis and conversion of the trivalent chromic acid salt to trivalent chromic hydroxide.

3. The apparatus as defined in claim 1, wherein said toxic constituent comprises cyanide ions and said first sensing means are operative to control said injection means for introducing chlorine into said solution in said first receptacle in an amount sufficient to form cyanogen chloride and an adjustment of the pH of said solution to a level above about 10 by the controlling addition of an alkali metal hydroxide, said second sensing means being operative to control the pH in said second stage to a level ranging from about 7.5 to less than about 9 by the addition of a mineral acid to effect an oxidation of the cyanate radical to harmless nitrogen and carbon dioxide.

4. The apparatus as defined in claim 1, wherein the volume of said first receptacle is greater than three times said preselected influx rate.

5. The apparatus as defined in claim 1, in which the volume of said first receptacle ranges from about ten times to about twenty times said preselected influx rate expressed in terms of gallons per minute.

6. The apparatus as defined in claim 1, wherein said first recirculating means is controlled to effect a rate of recirculation of said solution at a magnitude of at least about two times said preselected influx rate.

7. The apparatus as defined in claim 1, wherein said first recirculation means is controlled to effect a recirculation of said solution at a rate of at least about three times said preselected influx rate.

8. The apparatus as defined in claim 1, further including flow control means operatively associated with said inlet means for halting the flow of said waste solution into said first compartment in response to an imbalance in the chemical characteristics of the treated solution as sensed by said first and said second sensing means.

9. The apparatus as defined in claim 1, wherein the flow of said solution from said first receptacle to said second receptacle and out through outlet means is achieved by gravitational overflow in response to the entry of said waste solution at said preselected influx rate.

10. The method of continuously treating waste solutions containing toxic constituents therein comprising the steps of continuously discharging a waste solution into a first compartment at a preselected influx rate and in admixture with a solution therein, continuously withdrawing a portion of the admixed said solution at said preselected influx rate from said first compartment at a location remote from the point of entry of said waste solution and discharging the withdrawn said solution into a second compartment at an outlet point and in admixture with a solution therein, continuously sensing and monitoring the chemical characteristics of the admixed said solution withdrawn from the first compartment, continuously withdrawing and recirculating a portion of the admixed said solution from the second compartment at a location remote from the outlet point and returning the withdrawn said solution to the first compartment for admixture with the solution contained therein, continuously withdrawing a portion of the admixed solution at said preselected rate from the second compartment at a location remote from said outlet point and discharging the withdrawn said solution into a second receptacle at a discharge point and in admixture with a solution therein, continuously sensing and monitoring the chemical characteristics of the solution being discharged into the second receptacle, continuously recirculating a portion of the admixed solution in the second receptacle through a path by which a portion is returned to the discharge point, continuously withdrawing a portion of the solution at said preselected rate from the second receptacle at a location remote from said discharge point and discharging it to a sanitary sewer, adding chemical reagents to the solution in the first receptacle and in the second receptacle in response to the sensing of the chemical characteristics thereof for continuously converting the toxic ingredients into substantially harmless substances.

* * * * *